US006995888B1

(12) United States Patent
Kaneko et al.

(10) Patent No.: US 6,995,888 B1
(45) Date of Patent: Feb. 7, 2006

(54) OPTICAL SCANNING DEVICE

(75) Inventors: Koji Kaneko, Saitama (JP); Mitsuhiro Ohno, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 09/536,610

(22) Filed: Mar. 28, 2000

(30) Foreign Application Priority Data

Mar. 30, 1999 (JP) ................................ 11-089307

(51) Int. Cl.
*G02B 26/08* (2006.01)

(52) U.S. Cl. ...................................... 359/216; 359/200

(58) Field of Classification Search ........ 359/216–219; 247/243, 259–261
See application file for complete search history.

(56) References Cited

U.S. PATENT DOCUMENTS 6,285,482 B1 * 9/2001 Date .......................... 359/196

* cited by examiner

*Primary Examiner*—James Phan
(74) *Attorney, Agent, or Firm*—Young & Thompson

(57) ABSTRACT

An optical scanning device has a polygon mirror unit which is housed in a dust proof chamber and mounted on a mount configured so as to prevent generation of turbulence of a current of air that is caused due to high speed rotation of the polygon mirror which leads to fluctuations of rotation of the polygon mirror.

20 Claims, 5 Drawing Sheets

OPTICAL SCANNING DEVICE

BACKGROUND OF THE INVENTION

1. Field of the Invention

The present invention relates to improvements in an optical scanning device for scanning a subject medium.

2. Description of the Related Art

In recent years, with development of digital techniques and light sources, numerous high performance printing equipment and the like have been developed, wherein a scanning beam modulated according to image signals scans a subject matter, such as photographic pictures and printed matter (which is hereafter referred to as a scanning subject medium), that is sensitive to light to record an image on a paper. In such a printing equipment, the utilization is made of an optical scanning device to scan a scanning subject medium. This optical scanning device is, for typical example, configured such that a laser beam from a laser diode is repeatedly reflected and deflected by a rotary polygon mirror and further directed as a scanning beam to a subject medium through an f-θ lens.

In this type of optical scanning device, the polygon mirror that rotates at a speed sufficiently high causes a strong current of air therearound. In the case where the polygon mirror is received in a somewhat isolated chamber, the strong current of air hits against walls of the isolated chamber, or even in the case where the polygon mirror is placed in an open space, the current of air strikes parts laid around the polygon mirror, the current of air gets disturbed with an adverse effect of causing irregular rotation, or fluctuations of rotation, of the polygon mirror, which leads to unevenness of scanning on a subject medium, and hence inaccurate scanning. Although it is though to dispose the polygon mirror in a spacious place in the housing on the ground of this problem, it is undesirable in light of miniaturization of the optical scanning device.

A polygon mirror and an electric motor are usually previously assembled and attached to a base board 18 as one whole of polygon mirror unit for easy installation and removal and/or easy replacement upon an occurrence of break-down. The polygon mirror unit is usually installed to a precise mount provided within a body housing with an intention to place and adjust the polygon mirror in position accurately relative to a scanning beam projection optical system and a scanning optical system. Fluctuations of rotation of the polygon mirror had been a great problem in the optical scanning device of this type. For the purpose of providing a brief background that will enhance an understanding of the behavior of a current of air caused by a polygon mirror in an isolated chamber, reference is made to FIG. 7.

As shown in FIG. 7, a polygon mirror unit 300 which comprises an electric motor 319, a polygon mirror 317 integrated with an output shaft (not shown) of the electric motor 319, and a base board 318 on which the electric motor 319 secured is installed to a mount 310 provided within a dust free chamber 320. The mount 310 comprises U-channel support frames 310*a* arranged with an separation therebetween. The base board 318 at its four corners is secured to the U-channel support frames 310*a* by fastening bolts 310*b*. There are provided spaces below the polygon mirror unit 300, in particular, the base board 318.

In the mount thus constructed, when the polygon mirror 317 rotates at a high speed and causes a current of air within the dust free chamber 320, the current of air hits against walls of the dust proof chamber 320, as a result of which a turbulent air flow is generated. Under an influence of high speed rotation of the polygon mirror 317, the current of air partly easily flows into the spaced formed below the base board 318, so as to generates turbulent air flows with an adverse effect of distorting the base board 318 of the polygon mirror unit 300. In consequence, the polygon mirror 317 causes fluctuations of rotation, which is always undesirable for precise and stable scanning operation of the optical scanning device. Shown by reference characters 23, 24 and 25 in FIG. 7 are optical elements forming part of an f-θ lens system.

SAMMARY OF THE INVENTION

It is an object of the present invention to provide an optical scanning device which prevents a polygon mirror from causing irregular rotation due to a current of air generated by high speed rotation of the polygon mirror.

The foregoing object of the present invention is accomplished by providing an optical scanning device for scanning a subject medium with a scanning beam oscillated by a rotary polygon mirror, which comprises a polygon mirror unit including at least a polygon mirror and a generally rectangular base board to which the polygon mirror is fixedly attached, a dust proof chamber formed in a generally rectangular box-shaped housing for housing the polygon mirror unit therein, and mounting means disposed within the dust proof chamber for mounting the polygon mirror unit thereon through the base board, the mounting means being configured to prevent generation of turbulence of a current of air that is generated due to high speed rotation of the polygon mirror.

Specifically, the mounting means comprises a support frame which is configured in conformity with the base board so as to support the base board thereon from the back in a condition where the support frame is nearly in contact with a strip-like periphery of the base board, and a fitting frame which is configured in conformity with the base board so that the base board is fitted therein. The support frame may be provided with setting surfaces uneven with the support frame at four corners thereof so as to be in contacts with the base board at the four corners only. It is preferred that the difference between the setting surfaces and the support frame is less than approximately 0.5 mm. Further, the fitting frame may have a depth equal to a thickness of the base board. The mounting means is preferably provided in a recess formed in a bottom floor of the dust proof chamber.

According to the optical scanning system of the invention, even when the polygon mirror causes such a current of air as hitting against walls of the dust proof chamber and further generates turbulence of the current of air, the unique structure of the mount means prevents the current of air from penetrating under the base board and is never conducive to encouragement of the turbulence of the current of air. Accordingly, the base board is free from distortion, so as to keep the polygon mirror from fluctuations of rotation, as a result of which the optical scanning device is accurate and stable in scanning operation.

BRIEF DESCRIPTION OF THE DRAWINGS

The above and other objects and features of the present invention will be more apparent from the following detailed description in connection with a preferred embodiment thereof when reading in conjunction with the accompanying drawings, in which.

DETAILED DESCRIPTION OF THE INVENTION

Figure 1:
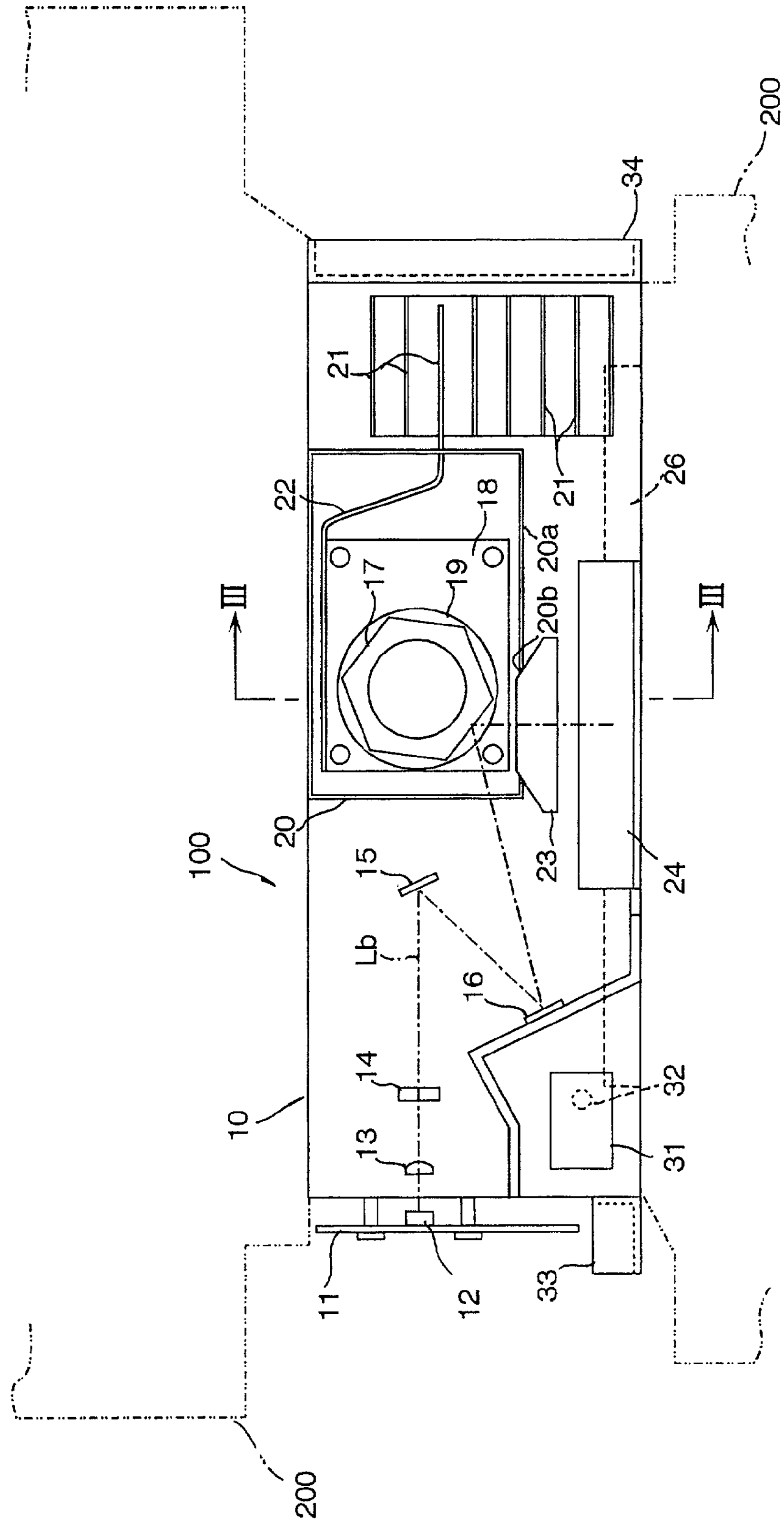
FIG. 1 is a top view of an optical scanning device with a top cover removed away.
Figure 2:
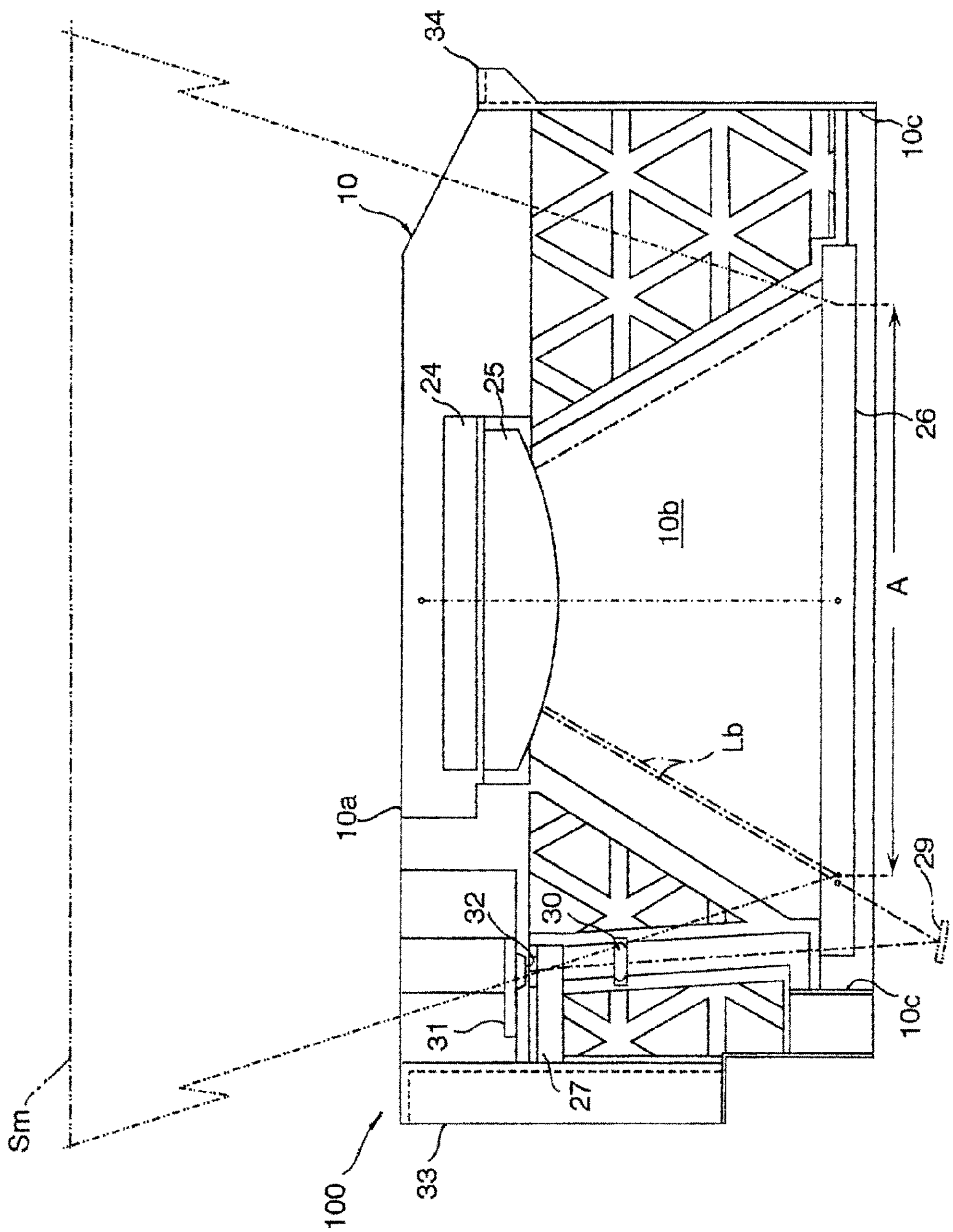
FIG. 2 is a front view of the optical scanning device.
Figure 3:
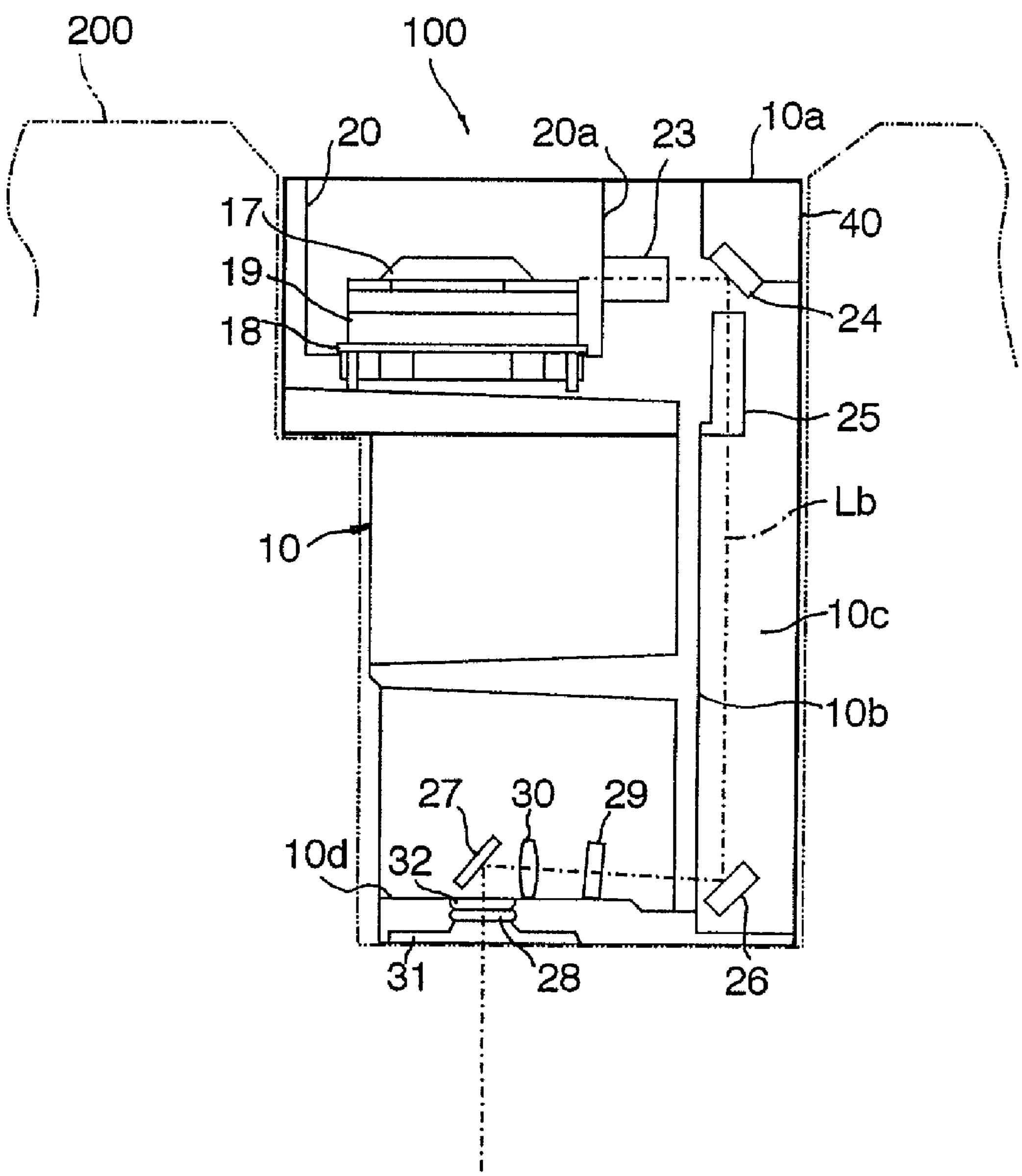
FIG. 3 is a cross-sectional view of FIG. 1 taken along a line III—III.

Referring to the drawings in detail, and in particular to FIGS. 1 to 3 showing an optical scanning device 100 equipped with an f-θ lens system in accordance with a preferred embodiment of the present invention, the optical scanning device 100, which is typically detachably fitted in a rectangular recess of an apparatus such as a printer schematically shown at 200 in FIG. 3 or put between two associated instruments such as another optical scanning device and a printer, has a generally rectangular parallelepiped box-shaped housing (which is hereafter referred to as a box housing for simplicity) 10. The box housing 10 is provided with a detachable cover 40 which has a generally inverse L-shaped form so as to cover the top of the box housing 10 and a rear space defined by the rear wall 10*b* and extensions of the opposite side walls 10*c*. The box housing 10 at opposite sides is provided with handles 33 and 34 integrally formed therewith for easy handling. Because the optical scanning device 100 has to provide a space sufficiently large for movement of scanning beam between the optical scanning device 100 and an instrument 200 to which the optical scanning device 100 is installed, the box housing 10 is preferably shaped to have a large width in a scanning direction and a small depth in a direction in which the optical scanning device 100 is installed to the related instrument 200. The optical scanning device 100 has a scanning optical system which comprises a polygon mirror 17, a scanning beam projection optical system arranged on one side of the polygon mirror 17 close to the laser diode 12, an f-θ lens system arranged on another side of the polygon mirror 17 which is at an angle of approximately right angle with respect to the side facing to the scanning beam projection optical system, and a scanning timing control optical system. The optical scanning device 100 further has a light source such as laser diode 12 that is mounted on a base board 11 of the box housing 10 so as to project a laser beam Lb along an optical path extending zigzag in a horizontal plane.

The scanning beam projection optical system comprises collimator lens 13, a cylindrical lens 14 and a pair of reflection mirrors 15 and 16 stationarily arranged in order from the laser diode 12 so as to direct the scanning beam Lb to the polygon mirror 17. The f-θ lens system comprises a first lens element 23, a first reflection mirror 24, a second lens element 25 and a second reflection mirror 26. The box housing 10 is formed with a dust proof chamber 20 for receiving a polygon mirror unit 150 which includes the polygon mirror 17 and the electric motor 19 with a control electric circuit (not shown) pre-assembled together to the base board 18 therein, so as thereby to keep the polygon mirror 17 from dust. These polygon mirror 17, electric motor 19 and electric control circuit are previously attached to the base board 18 as one whole of polygon mirror unit for easy installation and removal and/or easy replacement upon an occurrence of break-down. The dust proof chamber 20 is provided within the box housing 10 and has mounting mean 120 (which will be described in detail later) for mounting the polygon mirror unit thereon. Because the polygon mirror unit has to be installed and adjusted in accurate position relative to the scanning beam projection optical system and the scanning optical system, it is usual to install the polygon mirror unit to precise mounting means rather than installing it directly to the body housing 10. The polygon mirror 17 is directly and firmly secured to a rotary shaft (not shown) of an electric motor 19 that is mounted on the rectangular base board 18 and continuously rotated by the electric motor 19 in a counterclockwise direction as shown by an arrow in FIG. 1. As is well known in the art, the polygon mirror 17 reflects the laser beam Lb incident thereupon and deflects it toward the f-θ lens element system. On the top of the base board 18 there are arranged a number of electronic parts forming a control circuit (not shown). Because of installation of the motor and the electronic parts in the interior of the dust proof chamber 20, the dust proof chamber 20 is heated to a somewhat high temperature. On account of a rise in temperature of the dust proof chamber 20, the box housing 10 is integrally formed with, or otherwise provided with, a cooling fin arrangement having a plurality of internal cooling fins 21 arranged in the inside thereof and a heat pipe 22 through which the inside of the dust proof chamber 20 is thermally connected to the cooling fin arrangement, so as to cool the inside of the dust proof chamber 20. According to the construction of the dust proof chamber 20, although the electric motor 19 and the electronic parts are sealed within the dust proof chamber 20, the polygon mirror 17 is not only kept from dust but prevented from a rise in temperature with which reflective surfaces of the polygon mirror 17 usually cause distortion. The scanning optical system has an the f-θ lens system comprising two lens elements, i.e. the first lens element 23 and the second lens element 25, the first and second reflection mirrors 24 and 26. The first reflection mirror 24 is disposed in the optical axis between the first and second lens elements 23 and 25, and the second reflection mirror 26 is disposed in the optical axis after the second lens element 25. Specifically, as seen in FIG. 3, the first lens element 23 is directly fitted and secured in an opening 20*b* formed in a vertical side wall 20*a* of the dust proof chamber 20 and the second lens element 25 is secured to a rear vertical wall 10*b* of the box housing 10. The first reflection mirror 24 is disposed at an upper corner of the box housing 10 between the top of the box housing 10 where the first lens element 23 is disposed and the side of the box housing at which the second lens element 25 is and positioned right above the second lens element 25 so as to turn downward the optical axis at a right angle. The second reflection mirror 26 is disposed at a bottom corner of the box housing 10 between the bottom of the box housing 10 and the rear vertical wall 10*b* of the box housing 10 to which the second lens element 25 is secured. so as to turn back the optical axis at a right angle. The laser beam Lb reflected and deflected by the polygon mirror 17 passes first through the first lens element 23 forming another part of the f-θ lens system and then reflected and directed downward at a right angle by the first reflection mirror 24. The laser beam Lb directed downward further passes the second lens element 25 forming another part of the f-θ lens system and travels along the rear vertical wall 10*b* of the box housing 10 until reaching the second reflection mirror 26. Thereafter, the laser beam 12 is reflected and directed backward to the scanning timing control optical system for synchronization of scanning.

As shown in FIGS. 2 and 3, the scanning timing control optical system comprises a reflection mirrors 27 and 29 disposed behind the second reflection mirror 26, and a relay lens element 30 disposed between the reflection mirrors 27 and 29. The scanning timing control optical system is accompanied by an optical sensor 32 such as a photoelectric element sensor covered by a protective transparent glass 28. The reflection mirror 29 is located on a bottom wall 10*d* of the box casing 10, and the reflection mirror 27 is located on the bottom wall 10*d* of the box casing 10 as shown in FIG. 3 but slightly off set sideways from the reflection mirror 29 as shown in FIG. 2. Although the reflection mirror 29 is depicted on a straight path of the laser beam for an easy understanding in FIG. 2, it is actually located behind the second reflection mirror 26 as shown in FIG. 3. The reflection mirror 29 is small in size and located in the box housing 10 so as to receive and reflect back the laser beam Lb that is reflected forward by the second reflection mirror 26 at the very moment that the polygon mirror 17 turns and changes its active reflection surface on which the laser beam Lb directed by the laser beam projection optical system impinges from one to another, in other words, to receive only the laser beam Lb reflected by an extreme end of a given effective range of the reflection mirror 26 that is allowed for line scanning. The laser beam Lb reflected by the extreme end of the second reflection mirror 26 (which is hereafter referred to a synchronous laser beam) is reflected by the reflection mirror 29 and directed back to the second reflection mirror 26. Then the synchronous laser beam Lb is reflected again by the second reflection mirror 26 and directed to the reflection mirror 27 through the relay lens element 30 and further reflected downward by the reflection mirror 27 and directed to the optical sensor 32. The optical sensor 32 covered by the protective glass 28 is secured to a base board 31.

In response to reception of the laser beam Lb, the optical sensor 32 provides a control circuit of a printer that is equipped with the optical scanning device 100 with a synchronous signal for a start or an end of each line scanning of a scanning subject medium Sm.

Figure 4:
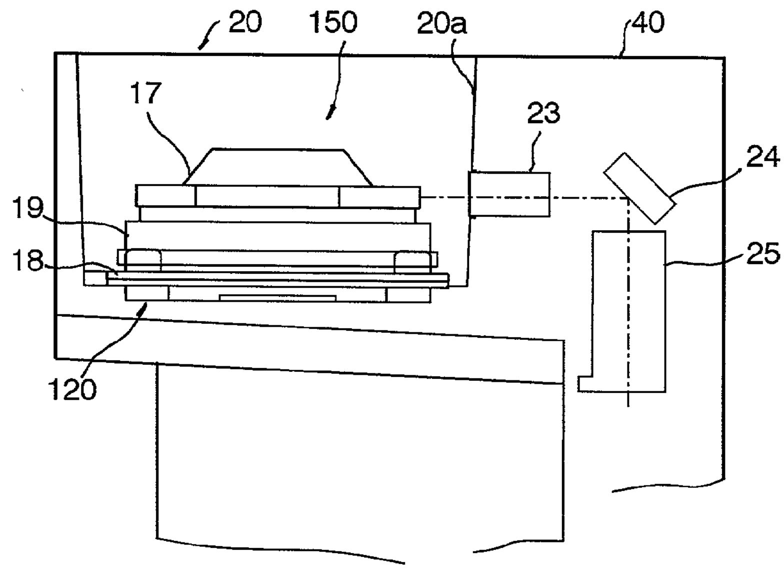
FIG. 4 is an enlarged view of a dust proof chamber with a polygon mirror unit installed therein.
Figure 5:
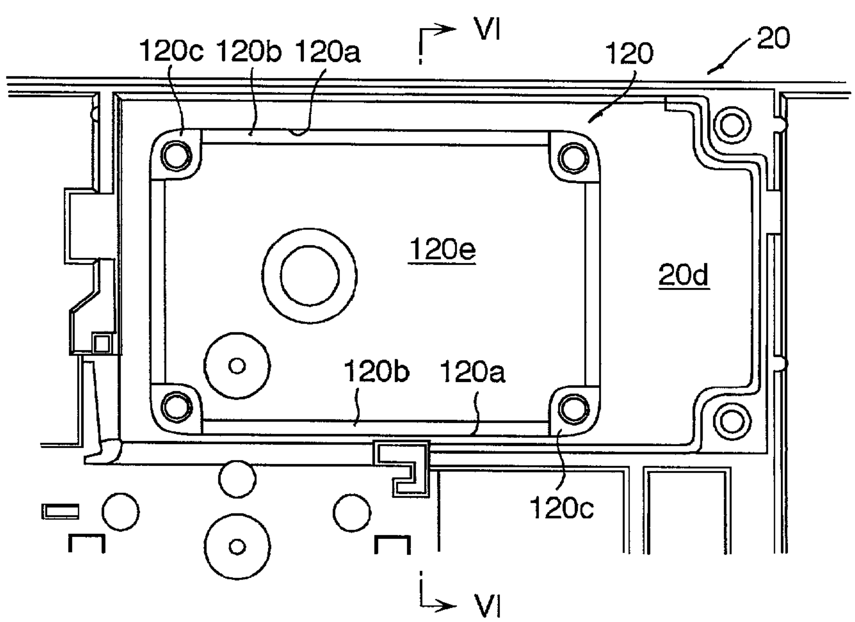
FIG. 5 is a plan view of a step mount of the dust proof chamber.
Figure 6:
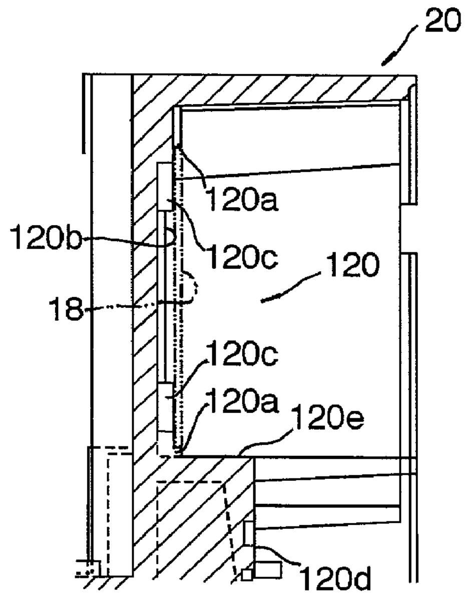
FIG. 6 is a cross-sectional view of the dust proof chamber of FIG. 5 taken along line VI—VI.
Figure 7:
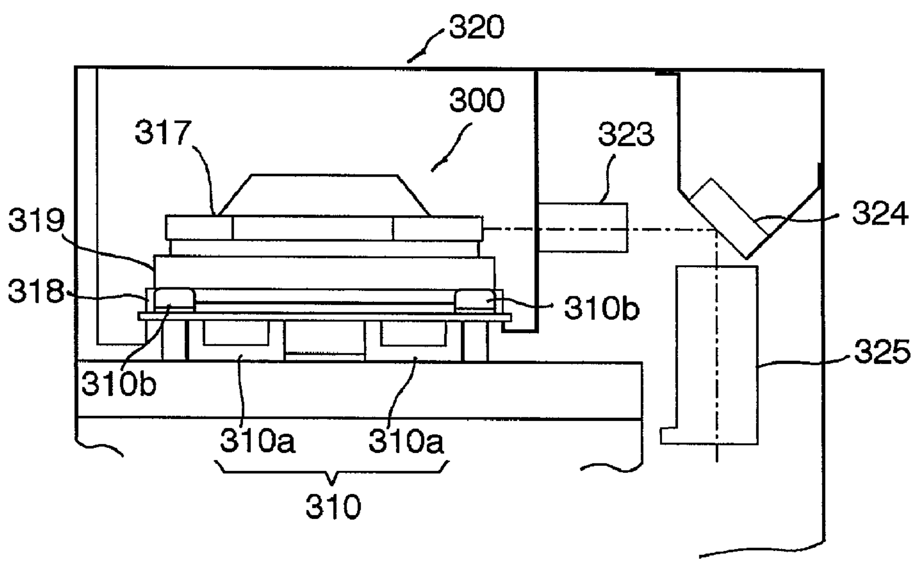
FIG. 7 is an enlarged view of a prior art dust proof chamber.

FIGS. 4 to 6 show details of a stepped frame mount 120 of the dust proof chamber 20. As shown in FIG. 4, the stepped frame mount 120, which is structured in a rectangular recess 20*e* formed in a bottom floor 20*d* of the dust proof chamber 20, comprises an outer rectangular fitting frame shoulder 120*a* and an inner rectangular support frame shoulder 120*b*, both of which are shaped in conformity to an outer configuration of the rectangular base board 18. The inner rectangular support frame shoulder 120*b* is formed so as to be uneven to the outer rectangular fitting frame shoulder 120*a* with a difference of, for example, approximately 0.5 mm at most. Specifically, the stepped frame mount 120 is configured such that the base board 18 is smoothly fitted in the outer rectangular fitting frame shoulder 120*a* and supported by the inner rectangular support frame shoulder 120*b* from the back. The stepped frame mount 120 at its four corners is provided with corner settings 120*c* which are level with the outer rectangular fitting frame shoulder 120*a* and to which setting screws are fastened to secure the base board 18. The stepped frame mount 120 provides a clearance or difference in level of 0.5 mm at most between the base board 18 mounted thereon and the inner rectangular support frame shoulder 120*b*.

Taking relative dimensional accuracy of the stepped frame mount 120 and the base board 18 into consideration, it is preferred to support the base board 18 on the stepped frame mount 120 at the four corner fittings 120*c* rather than supporting directly by the inner rectangular support frame shoulder 120*b*. Further the clearance between the base board 18 mounted thereon and the inner rectangular support frame shoulder 120*b*, i.e. a difference between the outer rectangular fitting frame shoulder 120*a* and the inner rectangular support frame shoulder 120*b*, is desirable to be as small as possible and allowed up to approximately 0.5 mm at most in light of dimensional accuracy of the dust proof chamber 20.

In operation of the optical scanning device 100 thus constructed, even when the polygon mirror 17 causes such a current of air as hitting against walls of the dust proof chamber 20 with the result of generating a turbulent air flow, the stepped frame mount 120 is not conducive to encouragement of the turbulent air flow because of preventing it from penetrating under the base board 18. As a result of which the polygon mirror 17 is effectively prevented from causing fluctuations of rotation, so as to keep the optical scanning device from an occurrence of inaccurate and unstable scanning.

It is to be understood that although the present invention has been fully described by way of the preferred embodiments thereof with reference to the accompanying drawings, various variant and other embodiments may occur to those skilled in the art. Unless these variants and embodiment depart from the scope of the present invention, they are intended to be covered by the following claims.

What is claimed is:

1. An optical device for scanning a subject medium with a scanning beam that is oscillated by a polygon mirror driven by an electric motor, said optical scanning device comprising:

a polygon mirror;

a base board for fixedly placing said polygon mirror thereon; and mounting means for mounting said polygon mirror thereon through said base board so as to place an axis of rotation of said polygon mirror directed vertically;

wherein said mounting means is configured so as to prevent a current of air generated due to rotation of said polygon mirror from penetrating into below said base board;

wherein said mounting means comprises a support frame which is configured in conformity with said base board so as to support said base board from the back in a condition where said support frame is nearly in contact with a strip-like periphery of the base board.

2. An optical scanning device as defined in claim 1, wherein said support frame is provided with setting surfaces arranged thereon at approximately regular separations and uneven with remaining surface of said support frame, said support frame being in contact with said base board at said setting surfaces only.

3. An optical scanning means as defined in claim 2, wherein each said setting surface is uneven with a difference of approximately 0.5 mm at most.

4. An optical scanning device as defined in claim 3, wherein said mounting means further comprises a fitting frame which is shaped in conformity with said base board so as to receive said base board therein and even with said setting surface of said support frame.

5. An optical scanning device as defined in claim 2, wherein said base board has a generally rectangular shape having a thickness, said setting surfaces are arranged at four corners of said support frame with a difference of approximately equal to said thickness of said base board from said support frame.

6. An optical scanning device as defined in claim 2, wherein said mounting means is provided in a recess formed in a bottom floor of a housing in which said polygon mirror is arranged.

7. An optical scanning device for scanning a subject medium with a scanning beam that is oscillated by a polygon mirror driven by an electric motor, said optical scanning device comprising:

a generally rectangular box-shaped housing;

a polygon mirror unit including at least a polygon mirror and a generally rectangular base board to which said polygon mirror is fixedly attached;

a dust proof chamber formed in said generally rectangular box-shaped housing for housing said polygon mirror unit therein; and mounting means disposed within said dust proof chamber for mounting said polygon mirror unit thereon through said base board so as to place an axis of rotation of said polygon mirror directed vertically;

wherein said mounting means is provided with turbulence prevention means for preventing generation of turbulent air flows due to rotation of said polygon mirror below said base board.

8. An optical scanning device as defined in claim 7, wherein said mounting means comprises a support frame which is configured in conformity with said base board so as to support said base board from the back in a condition where said support frame is nearly in contact with a strip-like periphery of the base board and a fitting frame which is configured in conformity with said board so that said base board is fitted therein.

9. An optical scanning device as defined in claim 8, wherein said support frame is provided with setting surfaces which are arranged at four corners thereof and in contact with said base board.

10. An optical scanning means as defined in claim 9, wherein each said setting surface is uneven with remaining surface of said support frame with a difference of approximately 0.5 mm at most.

11. An optical scanning device as defined in claim 9, wherein said fitting frame has a depth equal to a thickness of said base board.

12. An optical scanning device as defined in claim 9, wherein said mounting means is provided in a recess formed in a bottom floor of said dust proof chamber.

13. An optical device for scanning a subject medium with a scanning beam, comprising:

a base board;

an electric motor mounted to the base board, the electric motor having a rotary shaft;

a polygon mirror attached to the rotary shaft such that both the polygon mirror and the electric motor are disposed entirely on a first side of the base board; and a frame mount secured to a bottom face of the base board on a second side of the base board opposite the first side;

wherein the frame mount and the bottom face of the base board define a space below the base board, the frame mount and the bottom face of the base board being arranged so that rotation of the polygon mirror does not cause movement of air in the defined space.

14. The optical device of claim 13, wherein the base board, the electric motor, the polygon mirror, and the frame mount are arranged within a dust proof chamber.

15. The optical device of claim 14, wherein the frame mount is arranged on a floor of the dust proof chamber, the frame mount comprising:

a plurality of separate contact surfaces extending from the floor of the dust proof chamber, to which portions of a periphery of the base board are secured; and a strip extending from the floor of the dust proof chamber toward the periphery of the bottom face of the base board;

wherein the strip has a height from the floor of the dust proof chamber less than that of the contact surfaces, so that the strip does not make contact with the base board.

16. The optical device of claim 15, wherein the base board is generally rectangular in plan view, the contact surfaces being arranged at respective corners of the base board.

17. The optical device of claim 16, wherein the strip extends along the floor of the dust proof chamber between adjacent ones of said contact surfaces.

18. The optical device of claim 15, wherein the height of the contact surfaces is no more than 0.5 mm greater than the height of the strip.

19. The optical device of claim 16, wherein the height of the contact surfaces is no more than 0.5 mm greater than the height of the strip.

20. The optical device of claim 17, wherein the height of the contact surfaces is no more than 0.5 mm greater than the height of the strip.

* * * * *